(12) United States Patent
Makkonen

(10) Patent No.: US 9,058,544 B2
(45) Date of Patent: Jun. 16, 2015

(54) DEVICE AND METHOD FOR DETECTING A REGION OF INTEREST ON A DELIVERY OBJECT

(75) Inventor: Juha Makkonen, Helsinki (FI)

(73) Assignee: SYSLORE OY, Helsinki (FI)

( * ) Notice: Subject to any disclaimer, the term of this patent is extended or adjusted under 35 U.S.C. 154(b) by 0 days.

(21) Appl. No.: 14/240,070

(22) PCT Filed: Aug. 22, 2012

(86) PCT No.: PCT/EP2012/066315
§ 371 (c)(1),
(2), (4) Date: Feb. 21, 2014

(87) PCT Pub. No.: WO2013/026868
PCT Pub. Date: Feb. 28, 2013

(65) Prior Publication Data
US 2014/0185863 A1 Jul. 3, 2014

(30) Foreign Application Priority Data
Aug. 24, 2011 (FI) .................................... 20115821

(51) Int. Cl.
*G06K 9/00* (2006.01)
*G06K 9/62* (2006.01)
*G06K 9/32* (2006.01)

(52) U.S. Cl.
CPC ............ *G06K 9/6221* (2013.01); *G06K 9/3233* (2013.01)

(58) Field of Classification Search
None
See application file for complete search history.

(56) References Cited

U.S. PATENT DOCUMENTS

| 5,581,628 | A | | 12/1996 | Nakamura et al. | |
|---|---|---|---|---|---|
| 6,014,450 | A | * | 1/2000 | Heilper et al. | 382/101 |
| 7,266,218 | B2 | * | 9/2007 | Call et al. | 382/101 |
| 2003/0215113 | A1 | * | 11/2003 | Yoder | 382/101 |
| 2004/0223628 | A1 | * | 11/2004 | Call et al. | 382/101 |
| 2009/0208118 | A1 | * | 8/2009 | Csurka | 382/228 |
| 2010/0054585 | A1 | * | 3/2010 | Guillou et al. | 382/164 |
| 2010/0091330 | A1 | * | 4/2010 | Marchesotti et al. | 358/1.18 |

OTHER PUBLICATIONS

International Search Report, dated Dec. 21, 2012, from corresponding PCT application.

* cited by examiner

*Primary Examiner* — Andrae S Allison
(74) *Attorney, Agent, or Firm* — Young & Thompson

(57) ABSTRACT

A device and method for detecting a region of interest on a delivery object. In the method cluster identification data is stored. An item of the cluster identification data represents a cluster of image data items in a training set of image data items. A group of heat maps is stored. A heat map is associated with a cluster represented by the cluster identification data, and provides for cells of a grid a probability distribution for a probability of the cell belonging to a defined region of interest given the number of blobs in the cell. When a new image data item of the delivery object is received, the cluster identification data may be used to associate the input image data item with at least one cluster, and the heat map of the associated cluster to determine at least one region of interest in the image data item.

21 Claims, 7 Drawing Sheets

| BEFORE | |
|---|---|
| ADDRESS | John Doe |
| ADDRESS | c/o John Smith |
| ADDRESS | Any Street East 1301 |
| ADDRESS | 12345 Anycity |
| AFTER | *0102019910* |

DEVICE AND METHOD FOR DETECTING A REGION OF INTEREST ON A DELIVERY OBJECT

FIELD OF THE INVENTION

The present invention relates to delivery object processing systems and especially to a device and a method for detecting a region of interest on a delivery object, and a delivery object processing system, as defined in the preambles of the independent claims.

BACKGROUND OF THE INVENTION

A delivery object refers here to a physical object that may be delivered from a sending party to a receiving party based on destination address information provided with the physical object. Delivery objects are typically collected from a plurality of collection points used by sending parties to one or more processing sites. In a processing site, destination address information provided with the physical object is read and the physical object is routed according to the address information in a delivery service that delivers the physical object to the destination address, or to another processing site in a route towards the destination address.

The processing applies delivery information that should be available to it while the physical object is processed. As discussed, an important piece of delivery information is the destination address. The delivery object may, however, carry also other type of delivery information that may be relevant for a party involved with the delivery service. For example, in case delivery to the receiving party fails, the delivery object may need to be returned back to the sender. For this, the delivery object may carry address of the sending party. Furthermore, the provider of the delivery service may charge its services by means of postal indicia attached, stamped, or franked on the physical objects. It may be in the interest of the service provider to monitor that the values carried by the postal indicia of a delivery object indeed match with the defined service charges.

Delivery information provided on a delivery object thus refers here to any piece of information that is provided for a delivery processing system together with the physical object such that they form in combination a delivery object. The information may be located in some surface of a physical object, or be provided in a separate object that is attached to the physical object. The delivery information may also be provided or input separately to the processing system, as long as the logical connection between the physical object and the information is available to the processing system at the time the physical object is processed.

The volumes in efficient delivery systems are significant and the devices that transfer and scan the delivery objects need to be very fast. If the delivery objects are similar and delivery information is provided consistently according to a predefined convention, a specific region of interest is very easy to detect. This is not, however, the case in very many delivery systems. For example, in mail delivery systems, the size and shape and addressing conventions of the delivered mail objects vary significantly, so determination of the region of interest for a particular mail delivery process is not at all a straightforward task. Moreover, the present region of interest detection solutions seek a balance between throughput time and accuracy. Accuracy in region of interest detection means that the information forwarded from region of interest detection indeed comprises specific information that is relevant for one or more processing tasks. By compromising accuracy, one can achieve impressive processing times in the region of interest stage, but the disturbance to subsequent processing steps from use of irrelevant information may, however, be unacceptable.

Delivery information is typically provided in form of printed characters, so use of delivery information for the processing requires optical character recognition (OCR). Most OCR solutions easily detect regions carrying characters and identifying address information from recognized characters is naturally very accurate. However, OCR is a complex task that requires a lot of computing, and does not always meet the strict time requirements of efficient delivery systems. Image data items are thus preferably preprocessed to reduce the amount of data fed into OCR and thus minimize the delay caused by OCR to the processing.

It is known that accuracy of solutions may be improved before OCR with extensive rulesets by means of which a specific region of interest may be determined before OCR. However, such rulesets are typically application-specific, and may need to incorporate methods and conventions applied by a number of delivery object sources. This means that a lot of tailoring and maintenance effort must be vested for creating and maintaining such systems. In addition, rulesets can only cover a number of possible variations, so typically accuracy of ruleset-based systems varies between 50-70%.

BRIEF DESCRIPTION OF THE INVENTION

The object of the present invention is to provide a region of interest detection solution with improved overall performance in respect of accuracy and processing time. The objects of the present invention are achieved with a device, a system, a method and a computer program product according to the characterizing portions of the independent claims.

The preferred embodiments of the invention are disclosed in the dependent claims.

The present invention is based on the idea of using training data to create statistical models that capture the underlying probabilities or behavior of regions of interest in delivery objects processed by a delivery system. Instead of generating assumptions about and rules for the data to be analyzed, one generalizes empirical data and uses these generalizations to produce a useful output in new region of interest detection procedures.

The present invention has the advantage that the accuracy of region of interest detection for processed delivery objects is improved to levels achievable by OCR, even if OCR is not used.

BRIEF DESCRIPTION OF THE FIGURES

In the following the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of delivery object treatment methods and devices comprise elements that are generally known to a person skilled in the art and may not be specifically described herein.

Figure 1:
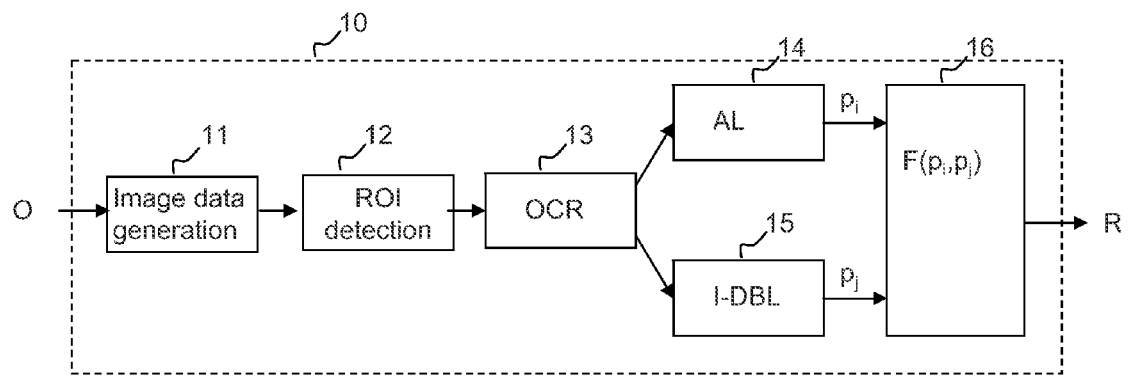
FIG. 1 illustrates stages of a procedure in a processing node of an automated processing system.

FIG. 1 illustrates stages of a procedure in a processing node 10 of an automated processing system. It is noted that only elements and stages that are essential for understanding the present invention are described here. For a person skilled in the art it is clear that handling of delivery objects in a processing node comprises several other manual and automated processes that are not discussed here in more detail.

The processing node 10 inputs a delivery object O and performs a processing function R that is determined in the processing node according to delivery information provided with the delivery object O. In delivery systems, delivery information is typically provided by a variety of sending parties so it is not readily applicable for automated processing, but requires transformation into a computer-readable form, typically into image data. The procedure thus begins by image data generation stage 11 where the delivery object is photographed and at least one image data item of the delivery object is formed. The image data item is advantageously a two-dimensional raster image data structure that represents a grid of pixels. A pixel refers here to a unit of the raster image that has an address that corresponds to its coordinates in the grid and has its own specific intensity. The intensity of the pixel provides a sample of the photographed delivery object, and can be represented by one or more digital values that correspond to component intensities of the pixel. These digital values can be stored, processed and transferred in an automated processing system.

In a ROI detection stage, 12 regions that carry relevant information for subsequent processing stages, especially to OCR, are identified and extracted for further processing. The ROI may be provided as a partial image extracted from the original image, or in some other form, for example as coordinates indicating outlines of the ROI. For one delivery object there may be different types of regions of interest and for one type of region of interest there may be more than one regions of interest or candidate regions of interest. The more accurate the ROI detection is the quicker and more accurate is the result of the optical character recognition and the subsequent processing stages following it in the processing node.

In the optical character recognition stage 13 delivery information is translated into machine-encoded text blocks. These text blocks may then be taken into functional units 14, 15 that apply the type of delivery information extracted from the delivery object. These functional units 14, 15 process the input text blocks according to their specific logic and generate parameters $p_i$, $p_j$, . . . to a processing unit 16 that uses the parameters to select the routing function R to be implemented by the processing node.

For example, let us assume that the system of FIG. 1 is a processing node in a mail delivery system. The first functional unit 14 may be an address lookup unit that inputs a character data block as a region of interest associated to delivery address type of delivery information. The first functional unit 14 recognizes different name and address data fields in the data block, compares defined data fields within the input character data block to records of an address database accessible to it. If a matching record is found, the first functional unit 14 validates the address for delivery and forwards to the processing unit 16 one or more parameters $p_i$ that indicate that the address is valid and carry identified pieces of routing information (country name, postal code, recipient street address, recipient name etc.) towards the receiving party. Address lookup units in advanced mail delivery systems may be complemented to implement also several other functions, like pre-sorting and sequencing of pre-announced mail delivery objects. If a matching record is not found, parameters $p_i$ may indicate this to the processing unit 16.

Let us assume further that the exemplary mail delivery system comprises also a measuring unit (not shown) where weight and/or size of processed mail delivery objects are recorded. In such a case the second functional unit 15 of FIG. 1 may be a business interest monitor that receives the recorded measurement records and also inputs a character data block included in a region of interest for postal indicia (glued stamps, stamps, franked marks, etc.). The second functional unit 15 may then identify characters indicating the payment made for mailing the delivery object and determine whether an adequate payment is made. Parameters $p_j$ indicate the payment status to the processing unit 16.

The processing unit 16 receives the parameters $p_i$, $p_j$ . . . regarding the mail delivery object from the respective functional units and uses them to determine how the mail delivery object is to be processed. In the simplified exemplary case, the processing unit may first use parameters $p_i$ to determine whether to forward the mail delivery object to routing information based sorting (address is valid) or to a manual processing made for unrecognized addresses (address is not valid). In addition, the processing unit may use parameters $p_j$ to determine whether to forward the mail delivery object to sorting normally or whether to modify the routing information to indicate that the mail delivery object must not be delivered to the destination address but can only be redeemed against payment from the closest post office. It is noted that the example is a simplified description intended to illustrate motivation for region of interest detection and importance of quick and accurate analysis of regions of interest in an automated delivery processing system.

Embodiments of the present invention relate to an improved ROI detection procedure that provides more accurate ROI extraction results without substantially increasing the time conventionally required for processing individual image data items. An improved ROI detection may be implemented routinely to image data items of all delivery objects in order to expedite the subsequent optical character recognition stage, as shown in FIG. 1. Improved ROI detection may also be implemented as a complementary stage to image data items that have failed OCR, or processing steps after OCR. For example, optical character recognition tools often incorporate simple ROI means, but they are not very accurate. OCR based on these regions of interest fail too often, or too many of the text data blocks fed to the functional units are unrecognized and therefore inapplicable for their intended purpose. Such failed delivery objects are typically taken to manual processing, but manual stages are laborious and therefore slow and very costly. These delays and costs may be avoided by applying improved ROI detection procedure to image data items of unsuccessfully processed delivery objects.

Embodiments of the invention are illustrated in the following with a system for delivery of mail objects, like letters, parcels, advertising leaflets, etc. The exemplary ROI type relates to the destination address, but based on the description, the procedure is easily applicable to other types of delivery objects and other types of regions of interest.

In a typical mail delivery system, the location of recipient's address is governed by a few simple rules. With simple location-based heuristics one can thus fairly easily reach ROI accuracy of 50-70%. Pursuing accuracy beyond that would, however, require maintaining a set of complicated and possibly mutually conflicting rules. For example, different cameras generate slightly different mages, so rules of ROI detection should always be compliant with the type of image. On the other hand, locating hand-written addresses would require rules different from those of machine-printed. Also different types of mail delivery objects (letters, other flat objects, parcels) may apply different addressing conventions. The few simple rules would thus need to be provided separately for each different addressing convention.

In order to avoid generation and maintenance of such rulesets, the embodiment of the present invention applies a form of artificial intelligence, machine learning that uses training data to capture the underlying probabilities or behavior. Instead of generating assumptions about and rules for the data to be analyzed, one generalizes empirical data and uses the generalizations to produce a useful output in new cases. For example, in the case of mail delivery systems, with appropriate sets of training data one is able to deal with different types of mail items originating from countries of different mail delivery conventions.

The improved performance is based on applying to an input image data item a two-dimensional probability distribution for detection of a defined ROI. Hereinafter this two-dimensional probability distribution for location of a defined ROI is referred to as a ROI heatmap. The ROI heatmap is generated by analyzing training data and its cells are associated with detected distribution for the probability that the cell belongs to a defined ROI given the number of blobs in the cell. The term blob refers here to a region of connected pixels, the intensity of which deviates in a similar manner from the surrounding. The term training data refers here to image data items of a known set of delivery objects. Position of a defined ROI may be considered to follow the same probability distribution in the training data as in image data items of delivery objects to be processed in the delivery system. The accuracy of the procedure is improved further by arranging image data items into clusters and applying cluster-specific ROI heatmaps. Due to this, an advanced ROI detection can thus be made without reading characters within the region.

Figure 2:
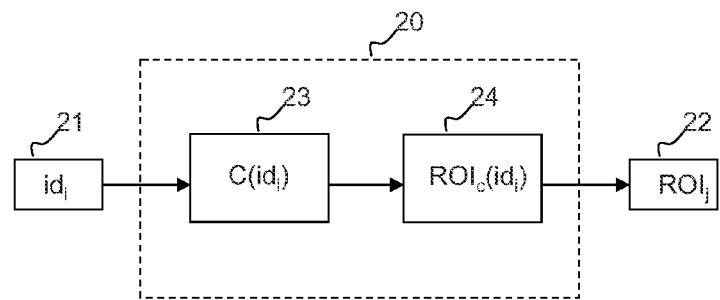
FIG. 2 provides a simple illustration of basic functions of an improved region of interest detection device.

FIG. 2 discloses an embodiment of the present invention with a simple illustration of basic functions of an improved ROI detection unit, implemented as a ROI detection device 20. The ROI detection device 20 inputs an image data item $id_j$ 21 of a delivery object and outputs one or more ROI candidates $ROI_j$ 22 for the input delivery object. The ROI detection device comprises a clustering engine 23 and a mapping engine 24. The engine refers here to a logical combination of hardware and software means that are configured to co-operate to implement a specific function, like clustering and mapping.

If mail delivery objects are handled such that orientation of the mail delivery object is not known before imaging, more than one image data item may generated for one mail delivery object. Determining the image data item that in the group of image data items of one mail delivery object most likely comprises relevant delivery information for future processing is a straightforward task and may be implemented with simple conventional means before images are fed into the ROI detection device 20. On the other hand, training data is typically based on image data items that carry relevant delivery information, so image data items that provide irrelevant information, for example a view to other sides of the mail delivery object, deviate from training data significantly. Superfluous image data items may thus be dealt with the clustering engine 23 of the ROI detection device 20, no separate filtering stage before it is necessarily needed. For conciseness, we assume here anyhow that an image data item $id_j$ that corresponds to the address-carrying face of the mail delivery item is input to the ROI detection device 20.

In general, clustering of data items means that a collection of data items are organized into groups of data items that are considered similar in view of at east one characteristic of the data item. The clustering engine 23 of the ROI detection device 20 of FIG. 2 uses clustering to arrange image data items into groups of similar members in view of ROI position. The clustering engine comprises a trainable probabilistic model that is first used to group the training data to a number of clusters. Clustering procedure generates cluster identification data that is stored in the clustering engine 23. During use, an input image data item $id_j$ is transformed into a form that matches with the form of the cluster identification data. The cluster identification data of the input mage data item may then be compared with the stored cluster identification data, and the result of the comparison may be used to associate the input image data item with one of the clusters.

If the rules governing the positions of relevant information were strictly obeyed, simple ROI extractor could be based on ROI heatmap only. The probability would then be greatest in cells where ROI occurs most often in the training data. In most practical delivery system implementations this is not, however, the case. For example, the image data items of mail delivery systems show a great variety in ROI locations, depending on the types of mail delivery objects. A greatly varying training data would provide a heatmap where probabilities are quite evenly distributed. It is clear that such heatmap would provide a very meager support for ROI detection. A more accurate result is achieved in the ROI detection device 20 by dividing training data to clusters of similar image data items and creating focused heatmaps for these clusters. New image data items may then be associated with a cluster and analyzed with a heatmap of the associated cluster. In cluster-specific heatmaps probabilities are based on ROI locations in mail delivery objects that are similar to one another, so variance of the modeled items is decreased whereby accuracy of the generated model increases.

Figures 3, 7:
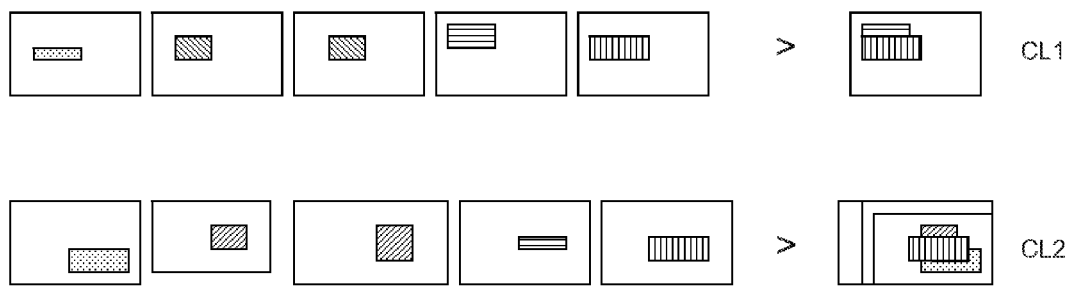
FIG. 3 illustrates division of image data items of a mail delivery system into clusters.
FIG. 7 illustrates an example of a region of interest candidate extracted from an image data item.

FIG. 3 illustrates division of image data items of a mail delivery system into clusters, CL1 comprises image data items from a variety of window-envelopes in which the destination address is typically closer to the left and top sides of the image. CL2 comprises image data items from a variety of conventional handwritten letters in which the destination address typically begins from around the vertical and horizontal centerlines of the face of the image. The image data items are piled into a resulting image that comprises shadowed regions that illustrate a region of increased probability for a location of ROI with destination address of the mail delivery object. An incoming new image data item may be compared to clusters CL1, CL2. If the image data item is similar to either of the clusters, it is likely that a destination address ROI of the mail delivery object is in the shadowed region of the respective cluster. Accurate location of the destination address ROI may be determined with a heatmap in which the probabilities in the shadowed region are encoded in more detail.

Figure 4:
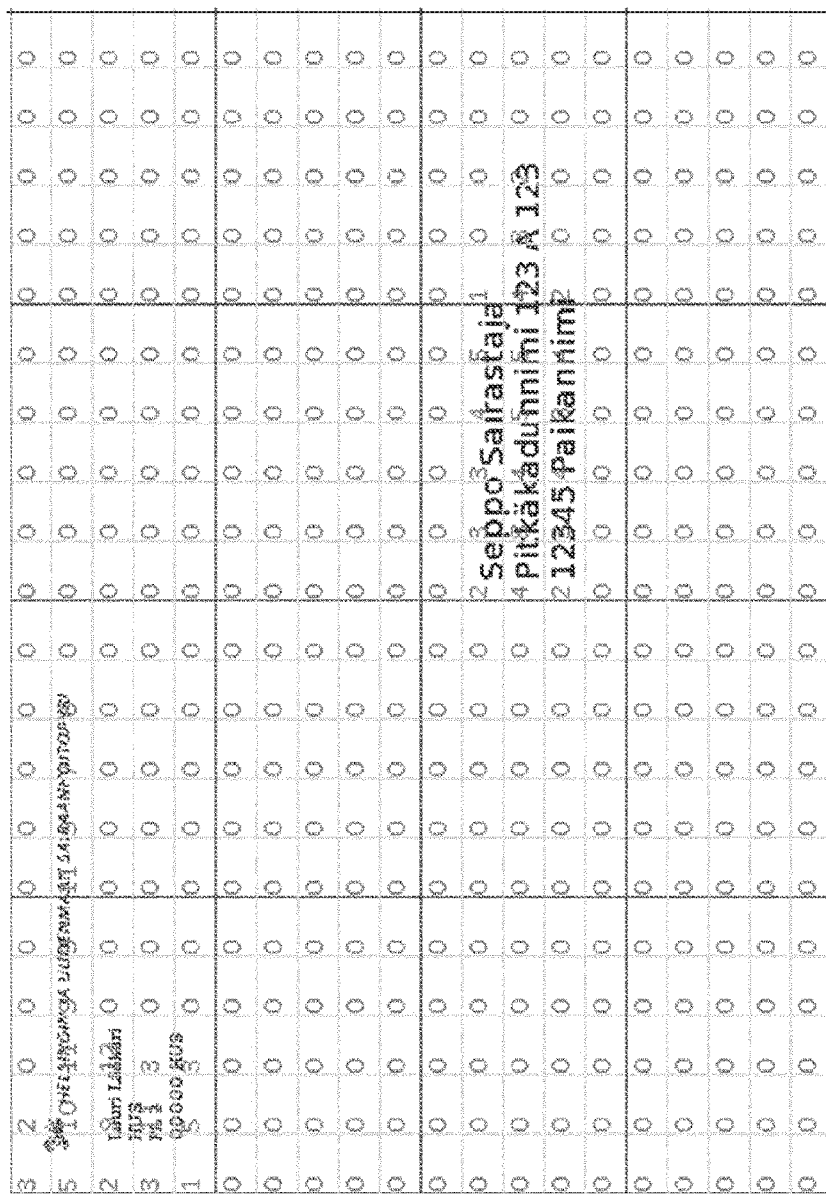
FIG. 4 illustrates an exemplary image data item created from a face of a letter.

For similarity comparisons, image data items may be transformed into vectors. Image data items of digital cameras are typically of megapixel resolution so comparisons in pixel level would be impractical and ineffective. For efficient computing, the input image data item is first tessellated into a series of contiguous cells. The cells are spatially indexed and form a grid that covers the region of the image data item. A vector element in a vector that represents the image data item corresponds to a cell of the grid. Vector value carried in the vector element corresponds to the number of blobs inside the cell. Blob counting is a well known procedure of image processing and several image processing systems comprise integrated components for the task. FIG. 4 illustrates an exemplary image data item created from a face of a letter that is sent to Seppo Sairastaja by his doctor Lauri Lääkäri. The image data item is tessellated into a grid of 20×20 cells, and each cell is spatially indexed by its row and column number. The number of blobs of each cell is written on top left corner of the cell. The grid may thus be transformed into a vector by concatenating the grid rows one after another. Image data items of the exemplary 20×20 cell grid yields vectors with 400 vector elements, each carrying the counted number of blobs. Image data vector of the exemplary image data item of FIG. 4 yields a 400-dimensional vector beginning with elements (3, 2, 0, 0, 0, 0, 0, 0, 0, 0, 0, 0, 0, 0, 0, 0, 0, 5, 10, 11, 9, 9, 11, 5, 7, 6, 0, . . . ). Similarity between two image data items may then be considered to correspond with the cosine or Euclidean distance of their image data vectors.

Clustering is initially based on training data that provides a collection of known image data vectors for statistical analysis. Advantageously, one applies a cluster analysis algorithm that not only classifies existing items, but also provides cluster identification information that represents characteristics of members of the clusters and lends itself for similarity comparison with image data items. An example of such algorithm is k-means. Other similar algorithms may, however, be applied within the scope of protection. K-means clustering is widely documented in the art and well known to a person skilled in the art. Given a set of observations $\{x_1, x_2, \ldots, x_n\}$, where each observation is a d-dimensional real vector, k-means clustering aims to partition the n observations into k sets (k≤n) $S=\{S_1, S_2, \ldots S_k\}$ so as to minimize the within-cluster sum of squares:

$$\underset{S}{\arg\min} \sum_{i=1}^{k} \sum_{x_j \in S_i} \|x_j - \mu_i\|^2$$

where $\mu_i$ the mean of points in $S_i$. Use of k-mean algorithm to the collection of image data vectors of the training data establishes a number of clusters and mean image data vector for each cluster. The applied number of clusters depends on the configuration and on the analyzed objects. With training sets of about 10000 image data items, the applied number of clusters is in the order of 25 to 40, depending on the variance of the image data items.

In the present invention, a ROI heatmap is related to a specific cluster and a defined type of ROI, and comprises a number of cells in a grid. The ROI heatmap provides for the cells of the grid a probability distribution of the cell belonging to the defined ROI given the number of blobs in the cell. Heatmaps may be generated from the training data using the grids and image data vectors that were applied in clustering, or the grid size may be adjusted separately to a level of granularity that is both efficient in terms of computations as well as in terms of ROI heatmap accuracy. In the latter case, image data items are tessellated and blobs counted separately for grids in the cluster identification data generation stage and for grids in the heatmap generation stage. Heatmap grid dimensions, like the number of clusters, typically vary according to the overall configuration and are typically selected and optimized during the training.

ROI probability distributions for a ROI heatmap are based on training image data items of one cluster. In the training stage each grid formed from a training image data item is analyzed cell by cell, and blob count of the cell is recorded. In addition, the value of a variable indicating whether the cell is considered to be in the ROI or not (ROI hit state) is recorded. For detection of value for this variable, an analyzed training image data item may be viewed visually in a display and a region of pixels may be selected for the ROI with a user interface function, for example as a box drawn around a detected ROI area in the display. After the pixels have been divided into cells, one may also detect and record whether a cell comprises selected pixels or not. Typically a cell is considered to be in the ROI if the cell is in the selected ROI region, or if at least one of its pixels belongs to the selected ROI region.

When all grids of training data items have been analyzed, recorded results for each cell comprise a distribution of blob counts and ROI hit states. This distribution may be generalized to represent the probability distribution to be associated with a specific cell in the ROI heatmap of the cell belonging to the defined ROI, given the number of blobs in the cell. For a simple generalization one may first establish records INROI and NOTINROI, which correspond to evident ROI hits states. Then, in pseudocode

```
for each grid2
    for each cell in grid2
        if cell in ROI
            store blobcount to INROI list
        else
            store blobcount to NOTINROI list
```

After this one can determine
for each cell of ROIheatmap
    for each blobcount
        read p1=No. of blobcounts in INROI list
        read p2=No. of blobcounts in NOTINROI list
        store p=p1/(p1+p2)

ROI heatmap may thus correspond to a simple group of cell-specific histograms plotting p versus blobcount.

More efficient and computationally effective methods are, however, available in the field of statistical analysis. For example, Bayes' theorem is applicable for determining what one's probability for the hypothesis should be, once the outcome from the experiment is known (posterior probability).

Accordingly, if 'ROI' denotes the hypothesis that a cell is in ROI and F the number of blobs in the cell the posterior probability that a cell is in ROI is given by Bayes' theorem $$p(ROI \mid F) = \frac{p(F \mid ROI)p(ROI)}{p(F)}$$

where:
p(ROI|F) is the probability of the cell being in ROI given the number of blobs is F
p(F|ROI) is the probability of the number of blobs being F given the cell is in ROI
p(ROI) is the probability of the cell being in ROI
p(F) is the probability of the cell containing F blobs.

The prior probability p(ROI) and marginal probability p(F) may be determined from the training data in a straightforward manner, as described above. In addition, one may model the training data with a statistical model, for example, expectation maximization algorithm and produce a univariate Gaussian mixture probability distribution for p(F|ROI). Methods and algorithms of statistical analysis and machine learning provide a large variety of tools for determining the probability distributions, given the training data. These tools are widely documented and well known to a person skilled in the art of computer-implemented procedures, and will not be discussed here in more detail.

Figure 5:
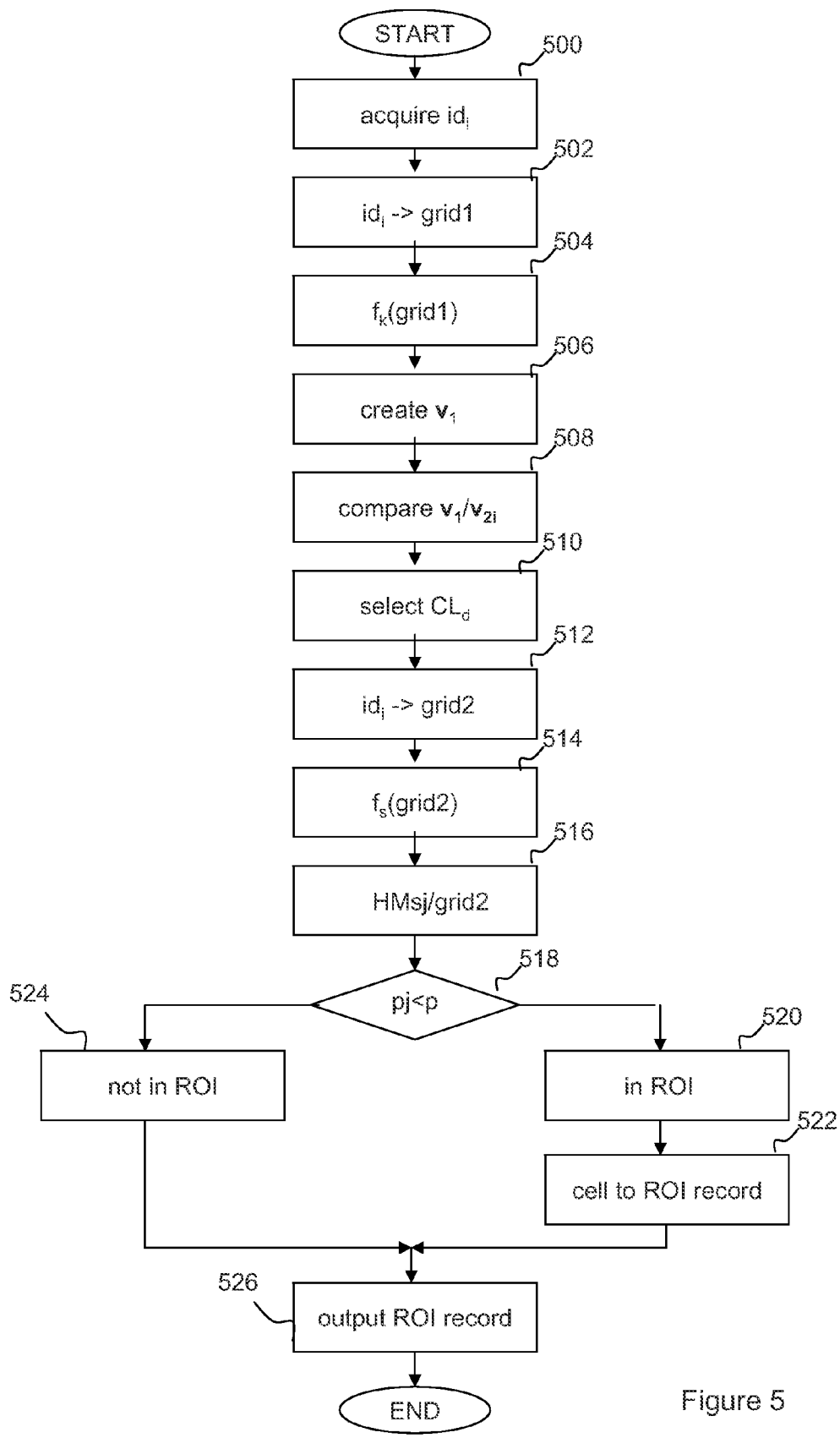
FIG. 5 illustrates a procedure implemented by a device during detection of region of interest candidates from an image data item.

The flow chart of FIG. 5 illustrates a procedure implemented by a device during detection of ROI candidates from an image data item. The procedure begins at a stage when the device is switched on and configured with a group of cluster identification vectors $v_{Ki}$, a group of cluster-specific heatmaps $HM_{jS}$, and a probability threshold value P. The cluster identification vectors $v_{Ki}$ and cluster-specific heatmaps $HM_{jS}$ are derived from a training set of image data items, as described above. The probability threshold value P is a parameter that is discussed in more detail herein. It is noted that the cluster identification stage and heatmap application stages may apply different or same grids.

The device comprises means for inputting an image data item of the delivery object. To acquire an image data item $id_i$ (stage 500), the device of the embodiment may comprise an incorporated or integrated camera unit or the device may receive the image data item $id_i$ from another unit of the delivery system it is being connected or integrated into. The image data item comprises a plurality of pixels, which the device divides into a first grid of K cells (stage 502). The device determines the number of blobs $f_k$ in each cell of grid1 (stage 504) and creates (stage 506) an input vector $v_1=(f_{1k}, f_{2k}, \ldots, f_K)$ such that vector values carry the determined blob counts in their respective cells.

The dimension of the cluster identification vector $v_{2i}$ is also K. The device compares (stage 508) the input vector $v_1$ with the cluster identification vectors $v_{2i}$ and determines which one of the cluster identification vectors $v_{2i}$ is most similar to (closest to) the input vector $v_1$. The comparison can be implemented by for example, taking an inner product of vector $v_1$ and the cluster identification vectors $v_{2i}$. The closest vector is the one that produces the greatest absolute value. The image data item is considered to belong to a cluster $CL_d$ identified by the closest cluster identification vector $v_{2d}$ (stage 512).

If different grids are applied for clustering and heatmap stages, the device divides the image data item into a second grid of S cells (stage 512), and again determines the number of blobs $f_s = f_{1s}, f_{2s}, \ldots, f_{Ss}$ in each cell of grid2 (stage 514). After this, the device applies (stage 516) the cell-specific probability distributions in heatmap $HM_{jS}$ to all cells $c_{jS}$ to determine the probability $p_{jS}$ of the cell belonging to ROI given the number of blobs $f_{is}$ in the cell. If (stage 518) the determined probability exceeds the predefined probability threshold value P, the cell is considered to belong to ROI (stage 520) and recorded (stage 522) as a ROI cell in a ROI record. If (stage 518) the determined probability does not exceed the predefined probability threshold value P, the cell is considered not to belong to ROI (stage 524). After the comparison, decision and potential recordation steps 518, 520, 522, 524 have been performed to all S cells of grid2, the ROI record is output (stage 526). This ROI record includes the group of recorded ROI cells and corresponds to a ROI detected from the input image data item $id_i$.

Figure 6:
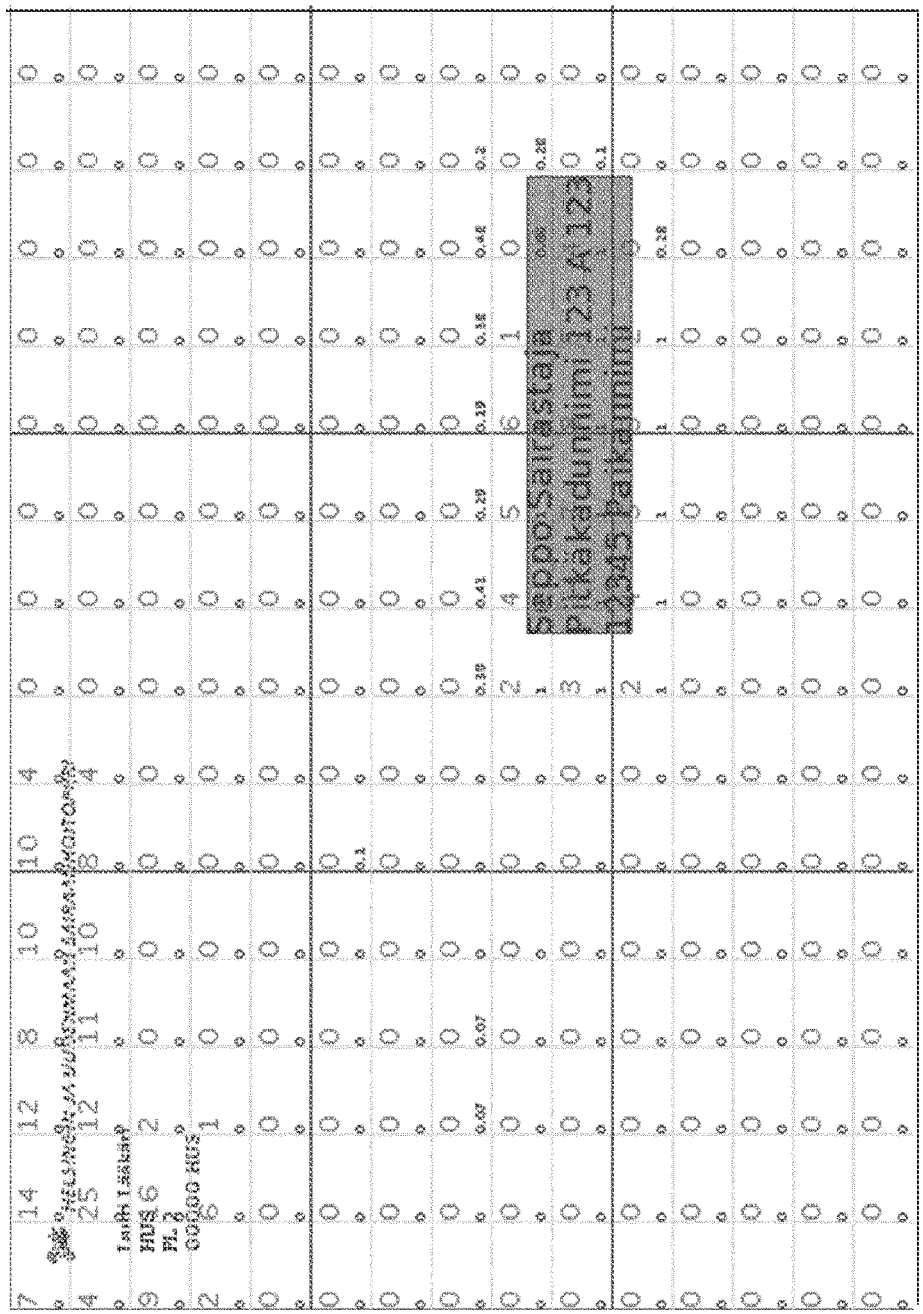
FIG. 6 illustrates use of a heatmap with the exemplary image data item of FIG. 4.

FIG. 6 illustrates the above described use of a heatmap with the example provided with FIG. 4. FIG. 6 shows figures of a heatmap placed on an image data item, both divided into the same grid of cells. The image data item is shown to comprise the destination address
Seppo Sairastaja
Pitkäkadunnimi 123 A 123
12345 Paikannimi
and the sender address
HELSINGIN JA UUDENMAAN SAIRAANHOITOPIIRI
Lauri Lääkäri
HUS
PL2
00000 HUS.

The number of blobs from these texts are counted for each cell and written in the top left corner of each cell. The bottom left corner of the cell comprises a figure that shows for each cell the probability that the cell belongs to the ROI, given that the cell comprises the number of blobs provided in the top left corner. These probabilities are read from cell-specific probability distributions stored in the cluster-specific heatmap. Let us assume that we want to include to the ROI all cells for which it is more probable that they belong to the cell than not. This means that we set the threshold value P for probabilities to 0.5, and the cells shadowed in FIG. 6 are extracted to ROI.

By means of this embodiment, the ROI can be detected from the image data quickly and accurately without needing to read the characters inside the ROI. The method applies application-specific training material, it does not rely on predefined rules. Due to this, detection is easily adopted to a wide range of character or writing styles and to varying ROT location conventions. Accordingly, use of training material-based heatmaps for ROI detection improves processing of the delivery objects significantly.

However, it is further noted that extracted regions of interest may comprise the information actually desired, but also some other types of elements showing as blobs, for example stains, logos, bar codes for sender's internal use, etc. In another embodiment of the invention, the primarily detected ROT candidates are developed further in order to eliminate sources of irrelevant blobs out of the ROI provided to OCR. FIG. 7 illustrates an example of a ROI candidate extracted from an image data item. It may be seen that if the ROI is expected to carry address information, both the bar code above the address and the number sequence below the address are not relevant for processing of the delivery object.

In order to refine ROI detection, one may use the training data to detect from the extracted ROI region ROI subregions that are not relevant for processing and to focus OCR to ROT subregions that are of the desired ROI type. ROI subregions are referred here as ROI blocks. In an exemplary case, detection of non-relevant ROI blocks is based on an assumption that interpretation of ROI blocks is a Markov process that has a discrete state space. The training data can be used as sequences of observations to train a Hidden Markov Model and create a state transition graph and state feature vector distributions for ROI blocks. When these are available, Viterbi algorithm may be used to find the most probable path in the graph, i.e. the most probable interpretation for the ROI block. Other statistical models, like Conditional Random Fields may be applied without deviating from the scope of protection.

For example, the image of FIG. 7 relates to destination address ROI, which typically comprises several lines of character strings, so separate lines in the ROI form separate ROI blocks in the ROI candidate. Detection of relevant ROI blocks thus refers to detection of lines that, according to some specific features and their mutual order are most likely destination address character strings.

Figure 8:
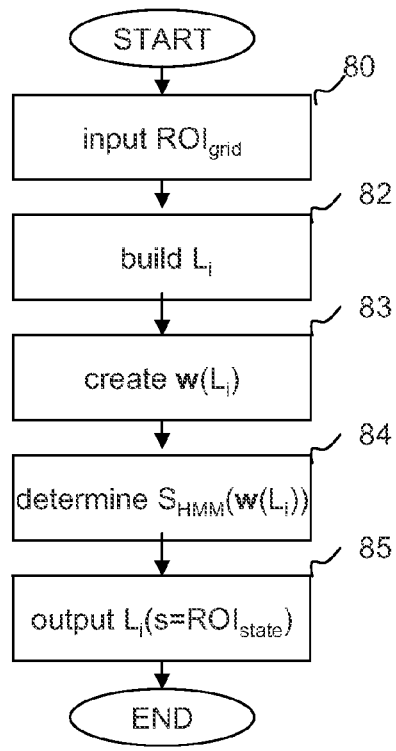
FIG. 8 illustrates a procedure implemented by a device during a further focusing stage of region of interest detection.

The flow chart of FIG. 8 illustrates a procedure implemented by a device during a further focusing stage for ROI detection. The procedure begins in a state where the device is in operative state and configured with a state model $s_{HMM}$ that stores a state transition graph and state feature vector distributions created on the basis of training data. The state model $s_{HMM}$ is based on the assumption that the initial ROI block is formed of ROI blocks such that each ROI blocks comprises one line of character strings.

The ROI detected by means of the procedure of FIG. 5 is input to the present procedure (stage 80) in form of a ROI grid, i.e. a detected ROI tessellated into cells that form a grid. The first task, both in the training phase as well as in the ROI detection stage, is thus to detect regions that constitute a line in the ROI grid (stage 82). This is a relatively straightforward task that applies again detection of blobs in cells. The device goes through the cells in the ROI grid and checks bounding boxes of blobs in the cell. A bounding box refers here to a minimum bounding rectangle within which all the pixels of the blob exist. Various publicly available algorithms exist for determination of bounding boxes from two-dimensional image data. The device may record lines by comparing bounding box of a blob to bounding box of an earlier detected line. If no earlier line exists or the bounding box of the blob does not overlap sufficiently in vertical direction a bounding box of any of the earlier detected lines, a new line is created and the bounding box is considered to comprise the bounding box of the blob. If overlap occurs, the blob is added to the line. As a result, one or more separate lines $L_i$ comprising a number of blobs are created.

The first stage of ROI detection described in FIG. 5 was based on univariate statistical modeling. Further refining may be achieved with multivariate models. The state model $s_{HMM}$ stores information collected from the training data in the form of selected features that may be determined for all ROI blocks and match well with features of the ROI type to be detected. Features that indicate how well a group of blobs in an image data item looks like a destination address are detectable by their display features and could comprise, for example, the average blob height, the average blob width, the number of blobs, the amount of whitespace above the blobs, the amount of whitespace below the blobs, and horizontal offset from the left side. Accordingly, both in the training stage as well as in the ROI detection stage the detected lines are translated to feature vectors. These features are advantageously normalized with respect to average blob dimensions so as to accommodate for different font sizes and types.

Hidden Markov models comprise two parts: state transition probabilities and state feature distributions. In the present exemplary case, the device applies three states for the detected lines:

ADDRESS that associates with the desired destination address ROI type
BEFORE for irrelevant blob groups before the destination address
AFTER for irrelevant blob groups after the destination address.

Figure 9:
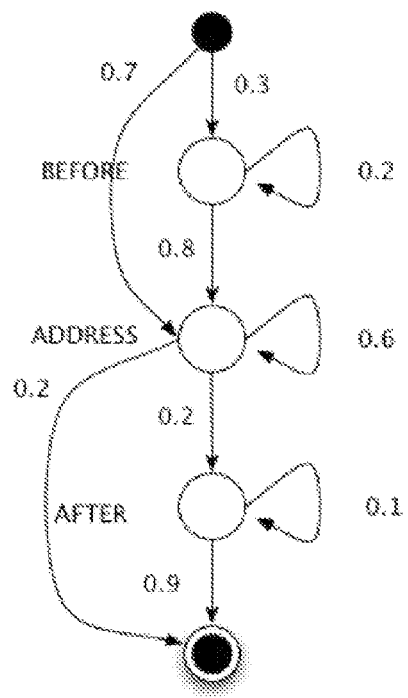
FIG. 9 shows an example of a state transition vector.

The training material comprises now a sequence of feature vectors associated with a detected state. The probability distribution of these feature vectors may be transformed into a multivariate Gaussian mixture model by means of, for example, expectation maximization algorithm. The three states yield different feature vector distributions. The state transition probabilities and feature vector distributions can be modeled from the training data by means of Baum-Welch algorithm. An example of a state transition vector computed with exemplary training data for the present states is shown in FIG. 9. The black dot represents the starting position and the circled dot the final state, respectively.

In order to be able to apply the stored state model $s_{HMM}$, the predefined features of the detected lines $L_i$ are determined and feature vectors $w(L_i)$ are created (stage 83) therefrom. These feature vectors create a sequence that is processed with Viterbi algorithm, which with the given state model $s_{HMM}$ associates these states with their most probable state (stage 84). The lines in state associated to the desired ROI type (s=ADDRESS) are recorded and forwarded (stage 85) as a ROI candidate. Other lines may be discarded from further processing.

It is noted that statistical analysis tools referred to above, like Bayes' equation, Gaussian mixture models, expectation maximization algorithm, Baum-Welch algorithm, Hidden Markov Model, and Viterbi algorithm are widely used methods of statistical computing and extensively documented in the state of the art. These tools, as such, are well known to a person skilled in the art of automated processing devices and may be easily implemented to a delivery object processing device with the context-related description provided herein.

The method of this further procedure provides even more accurate ROI results, still without having to actually interpret the content of the characters carried in the ROI. The processing time is increased with the necessary computations but not to the typical processing time levels required by the OCR. One may note that when used as a complement to the ROI detection described in FIG. 5, the size of the ROI grid and thus the number of cells to be analyzed is already significantly reduced. These advantages are again achieved by means of application-specific training material, not on predefined rules. The solution is thus easily adopted to a wide range of character or writing styles and to varying ROI location conventions.

In an optimal case the result comprises a number of lines that form a ROI that very likely comprises character strings carrying desired type of information that is relevant for further processing. In the previous example these character strings are in form of lines that carry address information of the receiving party. A delivery object may, however, carry many types of information and generate several groups of blobs and then propose two or more ROIs for further processing. Sometimes it is even advantageous to average the analysis by applying for one input data image heatmaps of two or more closest clusters. In such cases, the result does not comprise only one ROI but two or more ROI candidates that may not always point to the same area in the letter image. In such a case, it is advantageous to further rank the ROI candidates according to the probability that they indeed comprise the desired ROI.

Figure 10:
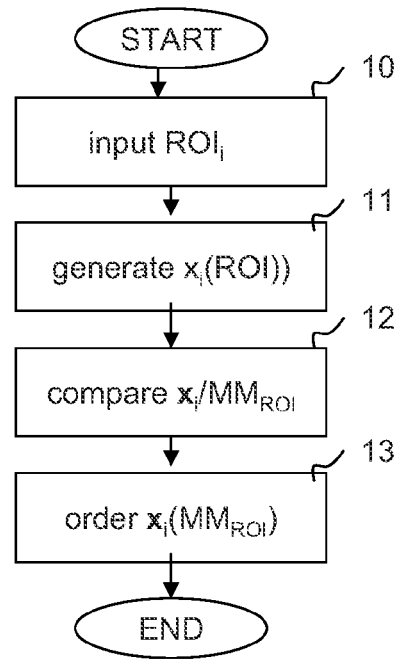
FIG. 10 illustrates a procedure implemented by a device during region of interest candidate evaluation.

The flow chart of FIG. 10 illustrates a further procedure that may be implemented by a device during ROI candidate evaluation. The description is based on the same device and the same exemplary image data set as the procedures of FIGS. 5 and 8, so additional information for the context may be referred from description of these embodiments. The procedure begins when the device is operative and configured with a multivariate Gaussian mixture model $MM_{ROI}$ generated from the training data. For the model $MM_{ROI}$, the text in bounding boxes of actual destination addresses is converted into a vector of features that are considered to determine well the features of the desired ROI, here the text strings carrying the destination address. Such features may comprise, for example, width of the area carrying destination address information, height of the area, number of lines in the destination address, number of blobs in the destination address, horizontal offset variation between the lines, average blob height and width in address information, etc. These features may be automatically identified with ordinary computer algorithms in the training data and also in image data samples. The feature vectors generated during the training stage are used to build a multivariate Gaussian mixture model (for example by means of expectation maximization algorithm) that is stored in the device for ROI candidate evaluation.

In the ROI detection stage, the number of ROI candidates, each carrying one or more lines of blobs are input (stage 10) for further processing. Each of these ROI candidates are analyzed and transformed into feature vectors $x_i(ROI)$ (stage 11). Each of these vectors $x_i(ROI)$ are compared (stage 12) with the Gaussian multivariate model $MM_{ROI}$. If the vector $x_i(ROI)$ deviates significantly from the model $MM_{ROI}$ it is likely that it is not ROI, and vice versa. A score corresponding to the level of deviation between the model and the compared vector is given to the respective ROI candidate (stage 13), after which the candidates may be arranged into order according to the likelihood that they indeed carry the desired destination ROI address.

For a person skilled in the art it is clear that use of the procedure is not limited only to ROI candidates that carry destination address. For different types of ROI, other types of feature vectors may be applied. With the above description, a person skilled in the art is able to apply a multivariate model trained with given training data to rank also other types of ROI candidates.

For the purpose of evaluating performance of the proposed device, detection of destination address ROI in three image datasets of mail delivery objects have been analyzed. The datasets originate from different countries and apply different addressing conventions. Images have been acquired in upright orientation and addresses were machine printed. Performance evaluation has been based on two measures, precision and recall. A 100% precision means that an extracted ROI contains only an address text and no other information (barcodes, codes or noise). A 100% recall means that all address pixels are in ROI. Obviously there is a trade-off between these measures, so to get a single evaluation measure these two detected measures are combined into a F1-score, which is a harmonic mean of the two. A device according to the invention was detected to achieve F1 values between 89.45% and 95.52%. Conventional ROI detection devices have not been able to show such performance without relying on semantic information revealed by reading the characters.

Figure 11:
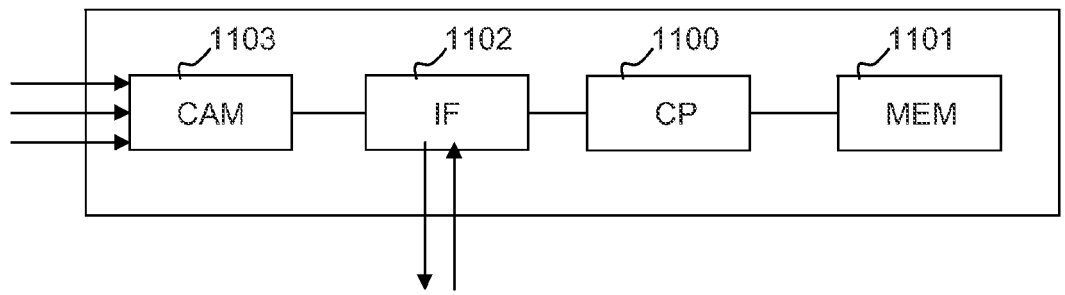
FIG. 11 shows a block diagram illustrating configuration of an exemplary device.

Embodiments of this invention relate to a device, applicable as a ROI detection device. The device provides means for implementing the above described methods. FIG. 11 shows a block diagram illustrating configuration of an exemplary device for the purpose.

The device comprises a processor unit 1100 for performing systematic execution of operations upon data. The processor unit 1100 is an element that essentially comprises one or more arithmetic logic units, a number of special registers and control circuits. Memory unit 1101 provides a data medium where computer-readable data or programs, or user data can be stored. The memory unit is connected to the processor unit 1100. The memory unit 1101 typically comprises volatile or non-volatile memory, for example EEPROM, ROM, PROM, RAM, DRAM, SRAM, firmware, programmable logic, etc.

The device also comprises an interface unit 1102 with at least one input unit for inputting data to the internal processes of the device and at least one output unit for outputting data from the internal processes of the device. The interface unit may be connected to an optional camera unit 1103 incorporated in the device, or to another device or apparatus that acts as a source of image data items.

The interface unit 1102 of the device may also comprise a user interface with a keypad, a touch screen, a microphone, and equals for inputting user data and a screen, a touch screen, a loudspeaker, and equals for outputting user data.

The processor unit 1100, the memory unit 1101, and the interface unit 1102 are electrically interconnected to provide means for systematic execution of operations on received and/or stored data according to predefined, essentially programmed processes of the device. These operations comprise the procedures and functions described for the device in FIGS. 1 to 11, and the means comprise the clustering engines and mapping engines of the device in FIGS. 1 to 11.

In general, various embodiments of the device may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any device-readable data storage medium and they include program instructions to perform particular tasks. The exemplary embodiments of this invention also provide a computer program product, readable by a computer and encoding instructions for executing a process for detecting a region of interest on a delivery object in the device of FIG. 11.

While various aspects of the invention may be illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A device for detecting a region of interest on a delivery object, comprising:
    a clustering engine;
    a mapping engine;
    the clustering engine comprising cluster identification data, an item of the cluster identification data representing a cluster of image data items in a training set of image data items;
    the mapping engine comprising a group of heat maps, a heat map being associated with a cluster represented by the cluster identification data, and providing for cells of a grid into which an image data item is tessellated in the training set of image data items a probability distribution for a probability of the cell belonging to a defined region of interest given the number of blobs in the cell;

the clustering engine being configured to input an image data item of the delivery object and to use the cluster identification data to associate the input image data item with at least one cluster;

the mapping engine being configured to use a heat map of the associated cluster to determine at least one region of interest in the image data item.

2. A device according to claim 1, characterized in that the clustering engine is configured to tessellate the input image data item into a grid of cells;
transform the image data item into an input vector;
compare the input vector with the cluster identification data; and
associate the input image data item with a cluster, the cluster identification data of which is closest to the input vector.

3. A device according to claim 2, characterized in that vector elements of the input vector correspond to the cells of the grid and carry vector values that represent the number of blobs in their respective cells.

4. A device according to claim 1, characterized in that clusters of image data items correspond to groups of similar image data items in view of ROI position.

5. A device according to claim 2, characterized in that the cluster identification data comprises cluster identification vectors, one cluster identification vector corresponding to one cluster of similar image data items in view of ROI position in a training set of image data items.

6. A device according to claim 5, characterized in that the cluster identification data that is closest to the input vector is a cluster identification vector that minimizes the absolute value of an inner product of the input vector and itself.

7. A device according to claim 1, characterized in that the grid of the clustering engine is different from the grid of the mapping engine.

8. A device according to claim 1, characterized by the mapping engine comprising a first statistical model for creating the probability distributions for the heat maps from the training set of image data items.

9. A device according to claim 8, characterized in that the first statistical model applies Bayes' theorem and expectation maximization algorithm to produce a univariate Gaussian mixture probability distributions for the heat maps.

10. A device according to claim 8, characterized in that
the mapping engine comprises a second statistical model for interpretation states, the second statistical model being based on detected states and state transitions in the training set of image data items, and
the mapping engine is configured to divide the determined region of interest into two or more region of interest blocks, region of interest blocks corresponding to discrete interpretation states; and
the mapping engine is configured to apply the second statistical model to evaluate the likelihoods of the region of interest blocks belonging to a desired region of interest.

11. A device according to claim 10, characterized in that the second statistical model is a Hidden Markov Model.

12. A device according to claim 11, characterized in that the region of interest blocks correspond to lines of character strings in the determined region of interest.

13. A device according to claim 10, characterized in that the second statistical model is a multivariate model, based on display features of the region of interest blocks.

14. A device according to claim 13 characterized in that the display features comprise one or more of the following: the average blob height, the average blob width, the number of blobs, the amount of whitespace above the blobs, the amount of whitespace below the blobs, and horizontal offset from the left side.

15. A device according to claim 1, characterized in that
the mapping engine comprises a third statistical model for features of the desired region of interest, the third statistical model being a multivariate model based on features of the desired regions of interest in the training set of image data items,
the mapping engine is configured to use heat maps of the associated cluster and one or more other clusters to determine two or more candidate regions of interest in the image data item; and
the mapping engine is configured to apply the third statistical model to evaluate the likelihoods of the two or more candidate regions of interest containing the desired region of interest.

16. A delivery object processing system comprising the device according to claim 1.

17. A method for detecting a region of interest on a delivery object, comprising:
storing cluster identification data, an item of the cluster identification data representing a cluster of image data items in a training set of image data items;
storing a group of heat maps, a heat map being associated with a cluster represented by the cluster identification data, and providing for cells of a grid into which an image data item is tessellated in the training set of image data items a probability distribution for a probability of the cell belonging to a defined region of interest given the number of blobs in the cell;
receiving an image data item of the delivery object;
using the cluster identification data to associate the input image data item with at least one cluster;
using a heat map of the associated cluster to determine at least one region of interest in the image data item.

18. A method according to claim 17 characterized by storing a first statistical model for creating the probability distributions for the heat maps from the training set of image data items.

19. A method according to claim 17 characterized by
storing a second statistical model for interpretation states, the second statistical model being based on detected states and state transitions in the training set of image data items, and
dividing the determined region of interest into two or more region of interest blocks, region of interest blocks corresponding to discrete interpretation states; and
using the second statistical model to evaluate the likelihoods of the region of interest blocks belonging to the region of interest.

20. A method according to claim 17, characterized by
storing a third statistical model for features of the desired region of interest, the third statistical model being a multivariate model based on features of the desired regions of interest in the training set of image data items;
using heat maps of the associated cluster and of one or more other clusters to determine two or more candidate regions of interest in the image data item; and using the third statistical model to evaluate the likelihoods of the two or more candidate regions of interest containing the desired region of interest.

21. A computer program product, readable by a computer and encoding instructions for executing the method of in a device for detecting a region of interest.

* * * * *